(Model.) 3 Sheets—Sheet 1.
E. EBI.
KNOTTER FOR GRAIN BINDERS.
No. 323,126. Patented July 28, 1885.
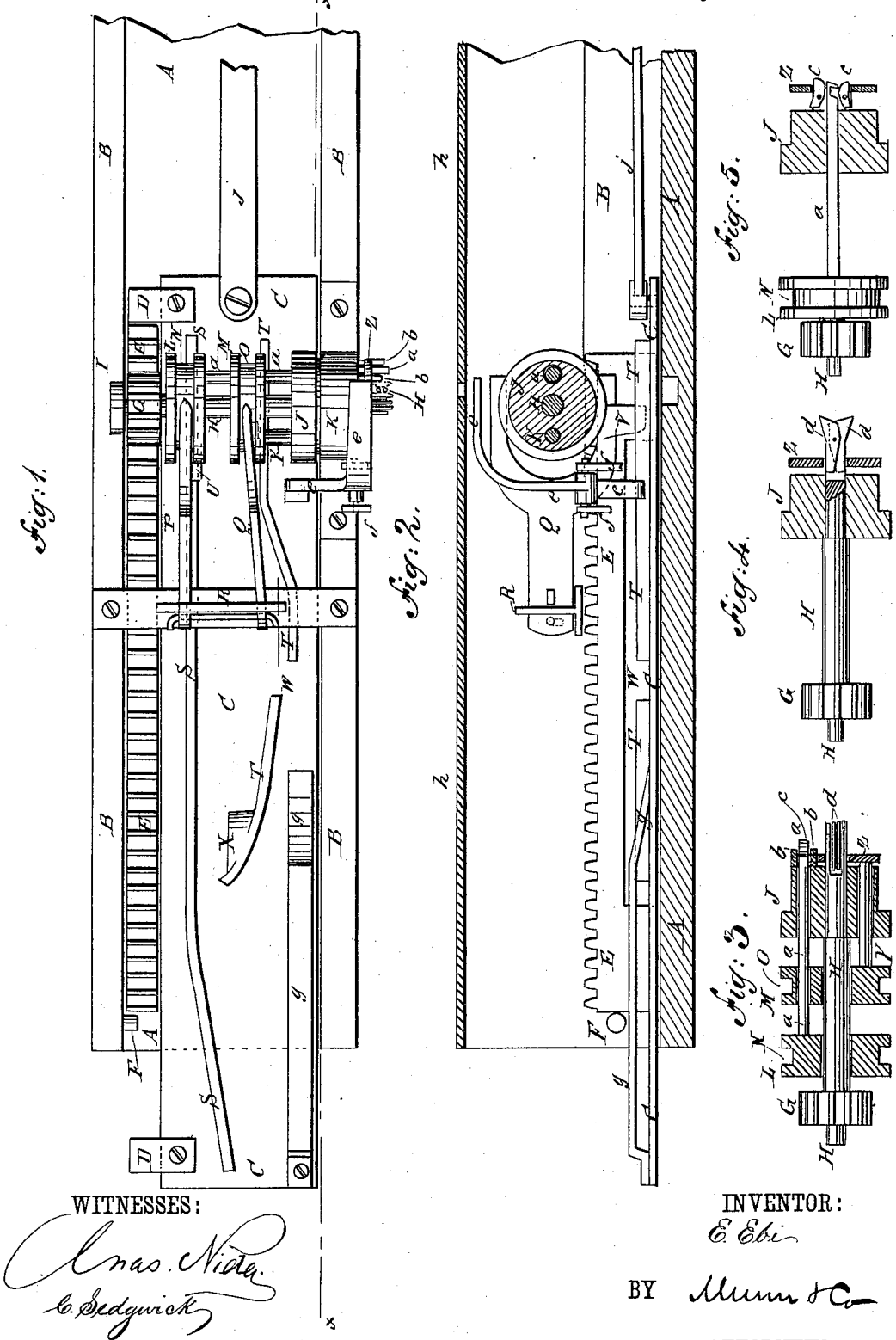
WITNESSES:
Chas. Nida
C. Sedgwick
INVENTOR:
E. Ebi
BY Munn & Co
ATTORNEYS.

(Model.)

3 Sheets—Sheet 2.

E. EBI.
KNOTTER FOR GRAIN BINDERS.

No. 323,126. Patented July 28, 1885.

WITNESSES:
Chas Nida
C. Sedgwick

INVENTOR:
E. Ebi
BY Munn & Co
ATTORNEYS.

(Model.) 3 Sheets—Sheet 3.

E. EBI.
KNOTTER FOR GRAIN BINDERS.

No. 323,126. Patented July 28, 1885.

WITNESSES:
Chas Nida
C. Sedgwick

INVENTOR:
E. Ebi
BY Munn & Co
ATTORNEYS.

UNITED STATES PATENT OFFICE.

EDWARD EBI, OF CEDAR RAPIDS, IOWA.

KNOTTER FOR GRAIN-BINDERS.

SPECIFICATION forming part of Letters Patent No. 323,126, dated July 28, 1885.

Application filed June 4, 1884. (Model.)

*To all whom it may concern:*

Be it known that I, EDWARD EBI, of Cedar Rapids, in the county of Linn, and State of Iowa, have invented a new and useful Improvement in Knotters for Grain-Binders, of which the following is a full, clear, and exact description.

Reference is to be had to the accompanying drawings, forming part of this specification, in which similar letters of reference indicate corresponding parts in all the figures.

Figure 6:
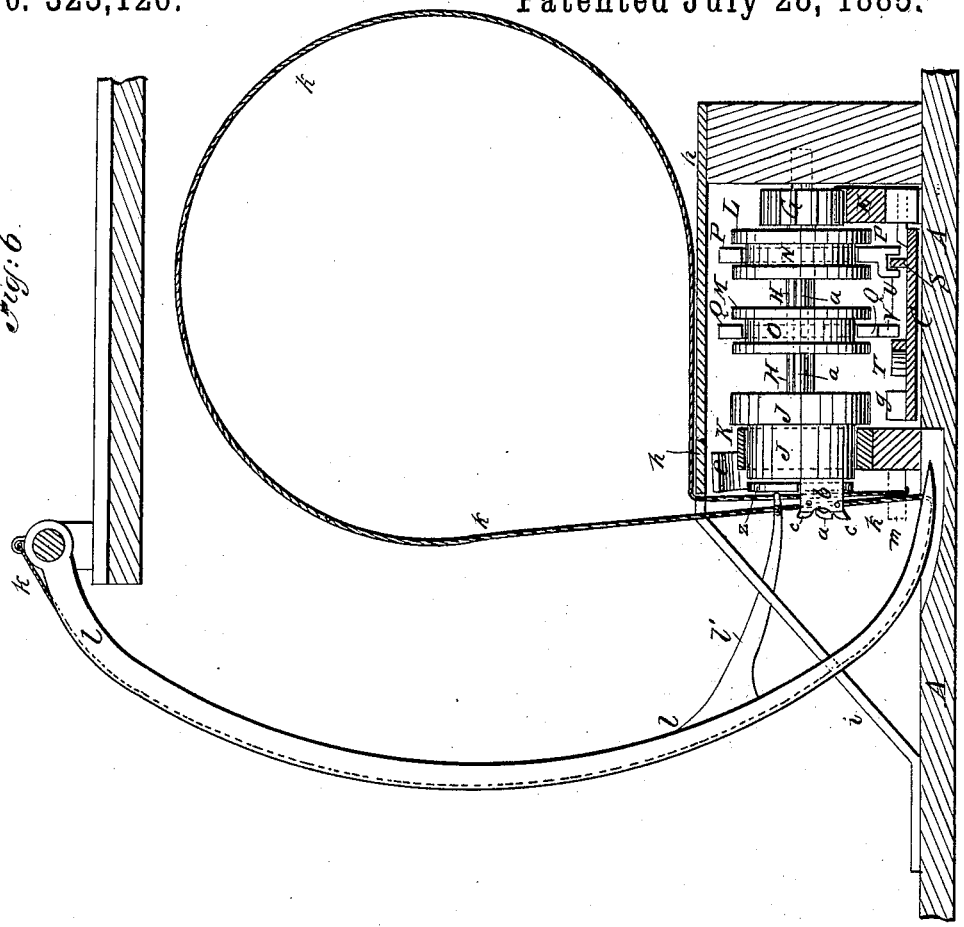
Figure 7:
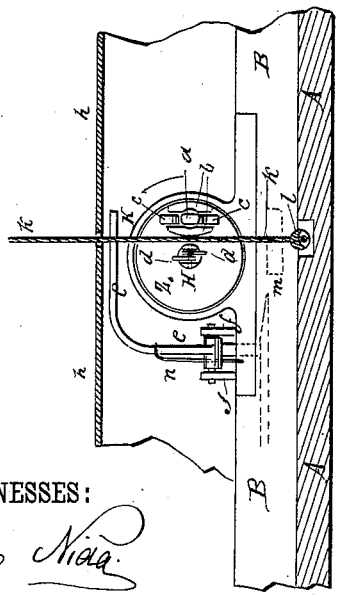
Figure 8:
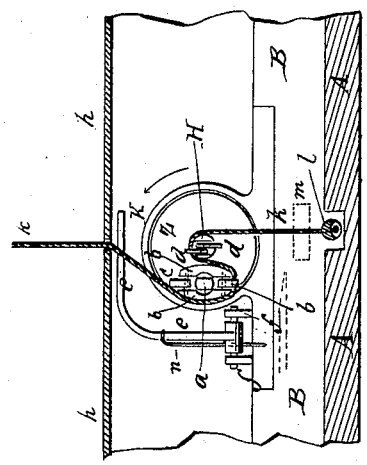
Figure 12:
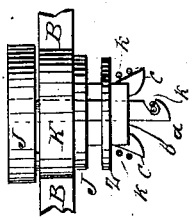
Figure 16:
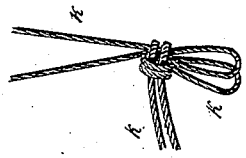
Figure 11:
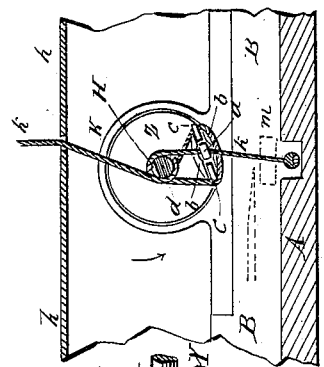
Figure 14:
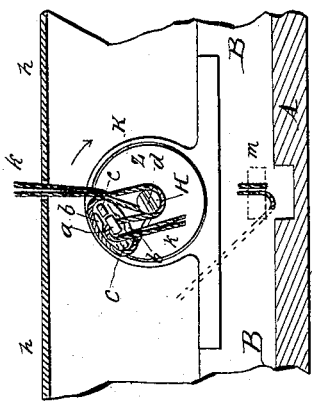
Figure 10:
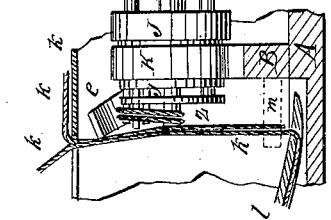
Figure 15:
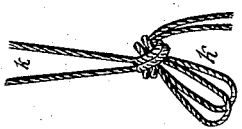
Figure 9:
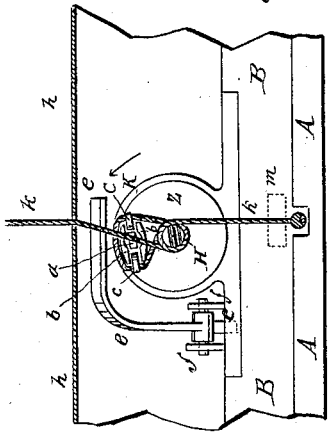
Figure 13:
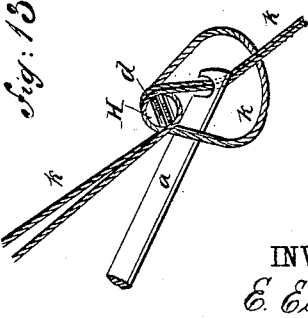

Figure 1 is a plan view of my improvement. Fig. 2 is a sectional side elevation of the same, taken through the line *x x*, Fig. 1. Fig. 3 is a view showing the gear-wheel, spindle, hook, and connecting-rod in side elevation, and the grooved wheels, knotter-head, and stripper-plate in section. Fig. 4 is a view showing the gear-wheel in side elevation, the spindle in side elevation, partly in section, and the knotter-head and stripper-plate in section, the spindle being turned one-quarter around from the position shown in Fig. 3. Fig. 5 is a view showing the gear-wheel, the hook, and its grooved wheel in side elevation, and the knotter-head and stripper-plate in section. Fig. 6 is an elevation of the improvement, showing the platforms in section and the cord in position to begin tying the knot. Fig. 7 is a front elevation of the same. Fig. 8 is a front elevation of the same, showing the position of the cord after the knotter-head has made half a revolution. Fig. 9 is a front elevation of the same, showing the position of the cord after the knotter-head has made one and a quarter revolution. Fig. 10 is a side elevation of the same. Fig. 11 is a front elevation of the same, showing the position of the cord after the knotter-head has made one and three-quarters revolution, and the hook has grasped the cord. Fig. 12 is a plan view of the same, the cord being shown in section. Fig. 13 is a diagram illustrating the manner in which the hook draws the ends of the cord through the loop. Fig. 14 is a front elevation of the improvement after the knotter-head has been turned back half a revolution and the loop is ready to be pushed off its holder. Figs. 15 and 16 are views showing different sides of the knot.

The object of this invention is to provide a knotter for grain-binders constructed in such a manner as to occupy but litte space, and be thus adapted for use on the ordinary sweep or table-rake reapers.

The invention consists in the construction and combinations of devices, as will be hereinafter fully described and claimed.

The sliding plate is provided with cam-guides engaging with forked levers, which operate grooved collars placed upon the spindle, and provided one with a rod passing through the knotter-head and attached to the stripper-plate, also placed on the spindle, and the other with a hook passing through the said knotter-head and stripper-plate, whereby the knot will be formed by the reciprocating revolution of the said spindle and knotter-head.

To lugs formed upon the knotter-head, upon the opposite sides of the hook, and to the spindle are pivoted pairs of loop-retainers adapted to be expanded to hold the cord-loop by the rearward movement of the stripper-plate, and contracted to loosen the cord-loop by the forward movement of the said stripper-plate, so that the cord-loop will be securely held and can be readily released.

The sliding plate is provided with a cam-guide operating a bent elbow-lever to hold back the cord from the stripping-plate and the cord-loop retainers after the loop has been formed, as will be hereinafter fully described.

A represents the platform of an ordinary reaper. To the platform A are attached cleats B to form a way or track within which slides a plate, C. Upon the end parts of the rear edge of the sliding plate C are formed, or to them are attached, lugs D to engage with the ends of a sliding rack-bar, E, interposed between the rear edge of the sliding plate C and the rear cleat, B, and which is made shorter than the space between the lugs D. The movements of the plate C and rack-bar E are limited by pins F or other stops attached to the rear cleat, B, or to the platform A. One of the stops F is shown in Figs. 1 and 2. The teeth of the rack-bar E mesh into the teeth of a pinion, G, attached to the spindle H, the rear end of which revolves in a bearing, I, attached to the platform A. To the forward part of the spindle H is attached the knotter-head J, the forward part of which is made of a smaller diameter and revolves in a bearing, K, attached to the platform A or other support. Upon the spindle H, between the pinion G and the knotter-head J, are placed two loose collars, L M, in the peripheries of which are formed grooves N O to receive, respectively, the forked ends of the levers P Q, so that the said collars L M will be moved forward and back by the movements of the said levers. The opposite ends of the levers P Q are hinged to a support, R, attached to the cleats B or other suitable support in such a manner that their forked ends can have a lateral movement. Upon the lower arms of the forked levers P Q, respectively, are formed lugs U V, to engage, respectively, with guide ribs or cams S T, formed upon or attached to the sliding plate C, so that the collars L M will be moved automatically forward and back upon the spindle H. The rear cam-guide, S, is continuous, and is so formed as to move the collar L forward and back at the proper time. The forward cam-guide, T, may be made with a break, as shown at W, Fig. 1, to allow the lug V to pass from the front to the rear side of the said guide when the sliding plate C is moving from right to left in Fig. 1, and with an incline or bridge, X, to allow the lug V to pass over the guide T from the rear to the front side of the said cam-guide T while the sliding plate C is moving back from right to left in Fig. 1. In the return movement of the plate C the lug V will not be acted upon by the cam-guide T, and the collar M will not be moved on the spindle. The forward cam-guide, T, is so formed as to move the collar M forward and back at the proper time while the sliding plate C is moving from right to left in Fig. 1. To the forward collar, M, is attached the rear end of the rod Y, which passes through a hole in the knotter-head J parallel with the spindle H, and to the forward end of the said rod is attached the stripper-plate Z, which, when the collar M is at the end of its rearward movement fits against the face of the knotter-head J, as shown in Figs. 1 and 3. The stripper-plate Z is forced forward by the forward movement of the collar M to push the loop of the cord off its holders, as will be hereinafter described. To the rear collar, L, is attached the end of the rod $a$, which passes forward parallel with the spindle H through holes in the forward collar, M, the knotter-head J, and the stripper-plate Z, and has a hook formed upon its forward end to grasp the cords near their ends and hold them while the loop of the said cord is pushed off its holders and over the bight held by the said hook. To the knotter-head J are attached, or upon it are formed, lugs $b$, which project through a recess in the stripper-plate Z, and to and between which are pivoted two hooked prongs or fingers, $c$, to serve as loop-retainers. The outer edges of the fingers $c$ are concaved, as shown in Fig. 5, and rest against the edges of the stripper-plate Z at the ends of the recess in the said plate, so that when the stripper-plate Z is drawn back against the knotter-head J the outer ends of the said fingers will be swung outward or exposed to receive and hold the loop of the cord, and when the said stripper-plate is pushed forward to push the loop off the said fingers their outer ends will be swung inward or contracted to allow the said cord-loop to be pushed off easily. Within and to the slotted forward end of the spindle H are pivoted the loop-retaining fingers $d$, the outer edges of which are recessed or concaved so that the outer ends of the said fingers $d$ will be expanded to hold the loop by the rearward movement of the stripper-plate Z, and contracted to allow the loop to be pushed off easily by the forward movement of the said stripper-plate Z.

$e$ is an elbow-lever pivoted at its angle to lugs $f$, attached to the forward cleat, B, at the side of the forward part of the knotter-head J. The upper arm of the lever $e$ is curved to bring its upper end over the forward part of the knotter-head J, as shown in the drawings. The lower arm of the lever $e$ extends inward, as shown in Fig. 1, and then downward, as shown in Fig. 2, so that its lower end will be struck and raised by the inclined part of the cam-bar $g$, attached to the sliding plate C, and held up by the horizontal part of the said bar. The upward movement of the lower arm of the bent lever $e$ swings the curved upper arm of the said lever forward to push the cord back from the face of the stripper-plate, after the knotter-head and stripper-plate have made about a revolution, to prevent the said cord from coming in contact with the loop-retainers during the subsequent movements of the said knotter-head and stripper-plate in tying the knot.

The knotter is designed to be attached to the platform A of a reaper beneath a low platform, $h$, which serves as a binding-table, and which is connected at its forward edge with the said platform A by an inclined apron, $i$.

The sliding plate C is designed to be operated from the driving mechanism of a reaper by a crank (not shown in the drawings) and a pitman, $j$.

In using the knotter the various parts are in the position shown in Figs. 1, 2, and 7. At the beginning of the operation the end of the cord $k$ is fast at $m$ in a gripper, which is not shown in the drawings, as it forms no part of my invention, and the curved needle $l$ is raised, drawing the first part of the said cord across the face of the stripper-plate between the hook $a$ and the spindle H, as shown in Fig. 7. The gavel is then collected from the platform A and swept up the inclined apron $i$ to the binding-table $h$ by the mechanism described in Letters Patent No. 278,521, granted to me May 29, 1883, and the needle $l$ descends, drawing the cord $k$ around the gavel and bringing the second part of the cord $k$ into the grippers hereinbefore referred to, and the location of which is indicated by the dotted lines $m$. Both parts of the cord are then pushed against the face of the stripper-plate Z by an arm, $l'$, of the curved needle $l$, the outer end of said arm being concave to better hold the cord in position. The sliding plate C now moves to the right, revolving the knotter-head J and the stripper-plate Z to the left and winding the two parts of the cord $k$ around the fingers $c$ and $d$, forming a loop, as shown in Figs. 8, 9, and 11. As the knotter-head J and stripper-plate Z are about completing their first revolution the upper arm of the bent elbow-lever $e$ moves forward, pushing the two parts of the cord $k$ out from the stripper-plate Z, so that the said parts of the cord will not engage with the fingers $c$ $d$ during the subsequent movements of the knotter-head and stripper-plate in forming the knot. When the knotter-head J and stripper-plate Z have nearly completed a second revolution, the hook $a$ is moved outward and engages with the two parts of the cord. As the hook $a$ grasps the two parts of the cord $k$ the said parts of the cord are cut off by a knife, (not shown in the drawings, as it forms no part of my invention.) The hook $a$ is withdrawn, clamping the two end portions of the cord, and the motion of the knotter-head and stripper-plate is reversed, slackening the cord. The stripper-plate Z is then pushed outward, pushing the loop of the cord off the loop-retainers $c$ $d$ over the bight held by the hook $a$, and allowing the knot to be drawn tight by the expansion of the bundle, or mechanical means may be employed. As the plate C continues its movement to the place of beginning the bundle is removed from the binding-table by hand or by a suitable mechanism, and the knotter is ready to bind another bundle. As the bar $g$ passes out from beneath the lower end of the elbow-lever $e$ the said lever is brought back to its former position by the weight of its lower arm, or by a spring, $n$, connected with it.

Having thus described my invention, what I claim as new, and desire to secure by Letters Patent, is—

1. In a knotter for grain-binders, the combination, with the reaper-platform A, of the revoluble knotter-spindle journaled transversely therein and the pinion G thereon, the slide C, having lugs D D, projecting from opposite ends of one side thereof, and the rack-bar E to one side of the slide C, and engaging the pinion G, the said rack-bar being of less length than the space between its operating-lugs D D, substantially as set forth.

2. In a knotter for grain-binders, the combination of the sliding plate C, provided with the cam-guides S T, the rack-bar E, the spindle H, provided with the pinion G, the knotter-head J, having lugs $b$, the forked levers P Q, the grooved collars L M, the rod Y, the hook $a$, and the stripper-plate Z, substantially as set forth, whereby the knot will be formed and completed by the reciprocating movement of the said sliding plate C.

3. In a knotter for grain-binders, the combination of the knotter-head provided with the lugs $b$, the hook $a$, the spindle H, the stripper-plate Z, and the pivoted loop-retainers $c$ and $d$, whereby the loop will be securely held and can be readily released, substantially as set forth.

4. In a knotter for grain-binders, the combination of the knotter-head, the loop-retaining fingers, the stripper-plate Z, the sliding plate C, having the cam-guide $g$, and the elbow-lever $e$, whereby the cord will be held back from the loop-retainers after the loop has been formed, substantially as set forth.

5. In a knotter for grain-binders, the combination of the kotter-head and means for operating the same with two laterally-reciprocating rods passed through the said knotter-head, and provided, respectively, with a hook and a stripper-plate, loop-retaining fingers pivoted to the knotter-head, substantially as described, and the needle provided with an inward-projecting arm constructed to press the cords against the stripper-plate, substantially as and for the purpose set forth.

EDWARD EBI.

Witnesses:
M. A. HIGLEY,
J. A. WILCOX.